United States Patent [19]

Kelly et al.

[11] 4,370,036

[45] Jan. 25, 1983

[54] SYSTEM AND METHOD FOR INTERMITTENTLY MOVING A PICTURE TUBE PANEL ON A LIGHTHOUSE

[75] Inventors: William R. Kelly; Ernesto J. Alvero, both of Lancaster, Pa.

[73] Assignee: RCA Corporation, New York, N.Y.

[21] Appl. No.: 267,991

[22] Filed: May 28, 1981

[51] Int. Cl.³ .......... G03B 41/00

[52] U.S. Cl. .......... 354/1

[58] Field of Search .......... 354/1; 430/23, 24, 26

[56] References Cited

U.S. PATENT DOCUMENTS

| | | | |
|---|---|---|---|
| Re. 21,907 | 9/1941 | Balsley | 250/41.5 |
| 3,636,836 | 1/1972 | Maddox et al. | 95/1 |
| 3,737,617 | 6/1973 | Llop et al. | 250/49.5 |
| 3,949,226 | 4/1976 | Dugan | 250/354 |
| 4,009,387 | 2/1977 | Nuver | 250/205 |
| 4,059,834 | 11/1977 | Hosokoshi et al. | 354/1 |
| 4,222,642 | 9/1980 | VanNes | 354/1 |
| 4,226,513 | 10/1980 | Shimoma et al. | 354/1 |
| 4,256,390 | 3/1981 | Fisher et al. | 354/1 |

*Primary Examiner*—John Gonzales

*Attorney, Agent, or Firm*—Eugene M. Whitacre; Dennis H. Irlbeck; Lester L. Hallacher

[57] ABSTRACT

The motion of a kinescope panel on a lighthouse is made intermittent by dividing the total excursion distance into intervals. Each interval is segmented into a move time and a dwell time which are expressed as move counts and dwell counts per interval. The counts per interval are changed in accordance with the required exposure time and the intensity of the exposing energy source.

11 Claims, 3 Drawing Figures

SYSTEM AND METHOD FOR INTERMITTENTLY MOVING A PICTURE TUBE PANEL ON A LIGHTHOUSE

BACKGROUND OF THE INVENTION

This invention relates generally to the production of phosphor screens for color picture tubes and particularly to a system and method for intermittently moving a faceplate panel during exposure of a phosphor screen on a lighthouse.

A color picture tube includes a screen composed of triads of different phosphors which emit different colored light when excited by electrons. Typically, the screen is composed of alternating stripes of phosphors which respectively emit red, green and blue light. Positioned between the screen and the electron gun from which the exciting electrons emanate is a color selection electrode, commonly called a shadow mask. The shadow mask assures that the electron beams excite phosphor stripes of the proper color.

During the production of the phosphor screen, the entire inside surface of the panel is coated with one of the phosphors mixed in a photosensitive material. The shadow mask is then inserted into the panel and the assembly is placed onto a lighthouse which contains a light source. Light from the light source passes through the apertures in the shadow mask and exposes some of the phosphor. The panel is moved with respect to the lighthouse during the exposure. The motion causes the phosphor to be exposed in solid stripes having a width substantially equal to the width of the apertures. However, the shadow masks are made of a thin sheet of light weight metal and therefore can vibrate because of the motion. Such vibration causes the width of the stripes to vary, resulting in an objectionable affect commonly called "snake".

The instant invention is directed to a motor control system for intermittently moving kinescope panels on a lighthouse during exposure of the phosphor screen to eliminate vibration of the shadow masks, and thereby eliminate the "snake" affect caused by such vibration.

CROSS REFERENCE TO RELATED APPLICATION

This invention can be used as the motor control system in the invention described in U.S. application Ser. No. (267,750) entitled "System And Method For Controlling The Exposure Of Color Picture Tube Phosphor Screens" filed of even date herewith by W. R. Kelly and E. J. Alvero and assigned to RCA Corporation, the assignee of the instant application.

SUMMARY OF THE INVENTION

A lighthouse used to expose the actinic energy sensitive coating on the inside surface of a picture tube faceplate panel includes an actinic energy source. A system for intermittently moving the panel with respect to the lighthouse includes a support for moveably supporting the panel on the lighthouse. A motor moves the support and thereby moves the panel on the lighthouse. A motor control intermittently moves and stops the panel motion for predetermined numbers of motion and dwell intervals while the coating is exposed to the actinic energy.

DETAILED DESCRIPTION OF THE PREFERRED EMBODIMENT

Figure 1:
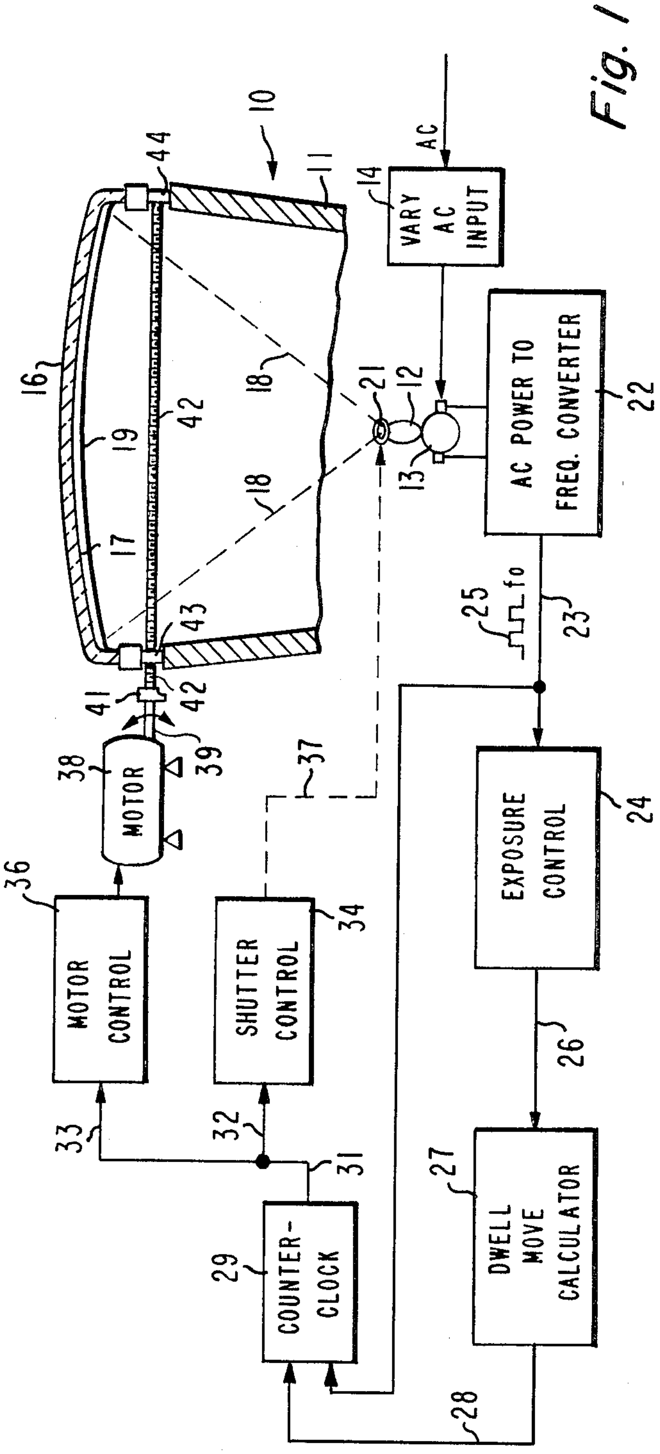
FIG. 1 is a simplified diagram of an exposure system in which the preferred embodiment can be utilized.

In FIG. 1, a Lighthouse 10 of known type, such as that disclosed in U.S. Pat. No. 3,949,226, includes a Housing 11, shown simplified and partially broken away. The Lighthouse 10 includes an actinic energy source which, typically, in the manufacture of color television screens is a Mercury Arc Lamp 12. A Power Supply 13 of known type energizes the Lamp 12. AC power is applied to the Power Supply 13 through a Variable Input Circuit 14 to permit desired changes of the AC power supplied to the Lamp 12.

A Picture Tube Panel 16 is positioned on the Lighthouse 10. The inside surface of the Panel 16 is provided with a screen in the form of a Coating 17 of actinic energy sensitive material which chemically reacts when exposed to Light Rays 18 emanating from the Lamp 12. Typically in color television tubes the actinic energy sensitive material is a mixture of phosphor particles, a polyvinyl alcohol and a soluble dichromate sensitizer, such as ammonium dichromate, for the alcohol. Arranged between the Lamp 12 and the Coating 17 is a Shadow Mask 19. The Shadow Mask 19 contains apertures through which electrons pass to excite the screen when the kinescope is in operation. The light from the Lamp 12 therefore passes through the shadow mask apertures and exposes the aperture pattern onto the Coating 17. A Shutter 21, of known type, is arranged between the Lamp 12 and the Coating 17 and the opening and closing thereof controls the illumination of the Coating 17 by the Light Rays 18.

The energizing power to the Power Supply 13 is monitored by an AC Power To Frequency Converter 22. The Output Signal 25 of the Frequency Converter 22 is a binary signal, such as a square wave, having a Frequency $f_o$. This signal is coupled by a Line 23 to an Exposure Control Circuit 24. The details of a circuit which can be used for the Exposure Control 24 are disclosed in previously referenced copending application Ser. No. (267,750). The output signal of the Exposure Control 24 is coupled by a Line 26 to a Dwell-Move Calculator 27 which causes the Motor 38 to move the Panel 16 intermittently in a dwell-move fashion. This type of motion eliminates vibration of the Shadow Mask 19 and thereby also eliminates undesirable variations in the widths of the phosphor lines which occur during constant panel motion, the affect commonly called "snake".

An Output Line 28 couples the output signal of the Dwell-Move Calculator 27 to a Counter 29. The Counter 29 provides output pulses on an Output Lead 31 in accordance with the Frequency $f_o$ of the square wave Control Signal 25 provided by the Power to Frequency Converter 22. The Lead 31 is connected to Leads 32 and 33 which respectively are the input leads of a Shutter Control 34 and a Motor Control 36. The Shutter Control 34 is coupled by a Lead 37 to the Shutter 21 to control the exposure of the Coating 17 by light from the Lamp 12. The output signal of the Motor Control 36 is provided to a Motor 38, such as a stepping motor. The Shaft 39 of the Motor 38 is connected by a Coupling 41 to a Lead Screw 42 which is fed through threaded Mounting Brackets 43 and 44. Accordingly, rotation of the Shaft 39 results in linear movement of the Panel 16 with respect to the Lighthouse 10.

Figure 2:
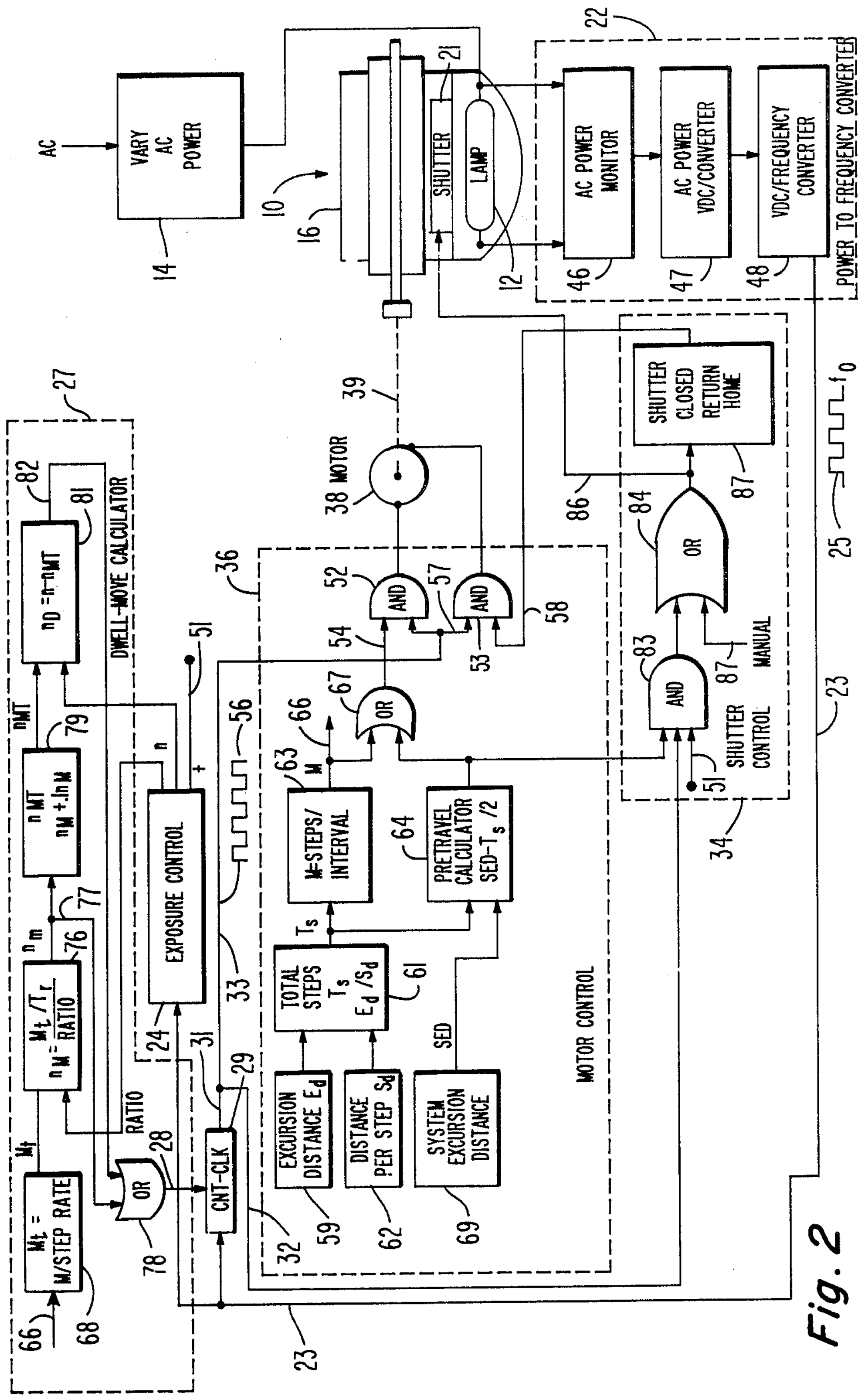
FIG. 2 is a preferred embodiment of a motor control which can be used in the exposure system of FIG. 1.

In FIG. 2, the Frequency Converter 22 includes an AC Power Monitor 46 which monitors the power across the Lamp 12. The output of the Power Monitor Circuit 46 is converted to a DC voltage by an AC Power to DC Voltage Converter 47, the DC voltage output level of which is proportional to the input power across the Lamp 12. The DC voltage output of the converter 47 is provided to a VDC to Frequency Converter 48, the output of which is a binary signal, such as a square wave, having a Frequency $f_o$ related to the input power to the Lamp 12. The Control Signal 25 is provided to the Exposure Control Circuit 24. Exposure Control Circuit 24 provides a Counts/Interval Signal n to the Dwell-Move Calculator 27 and a Preset Exposure Time Signal t in the manner fully described in previously referenced copending U.S. application Ser. No. (267,750).

A Counter-Clock 29 receives the Control Signal 25 and the output of the Dwell-Move Calculator 27 to provide pulses on the output Line 31 in accordance with the Frequency $f_o$ of the Control Signal 25 and the dwell-move inputs provided by the Dwell-Move Calculator 27 in a manner described more fully hereinafter. The output pulse train of the Counter-Clock 29 is provided to the Motor 38 through one of the AND Gates 52 or 53. When both input leads of the AND Gate 52 are simultaneously energized, the output pulses from the Counter 29 are provided to the Motor 38 to cause the Motor 38 to intermittently move the Faceplate 16 with respect to the Lighthouse 10. However, when the input Terminals 57 and 58 of the AND Gate 53 are simultaneously energized the Motor 38 runs in the opposite direction to return the Faceplate 16 to a neutral, or home, position with respect to the Lighthouse 10.

The Motor Control 36 includes an Excursion Distance Circuit 59 which provides an Excursion Distance Output Signal $E_d$. The Excursion Distance $E_d$ is dependent upon the size of the Panel 16 to be exposed and therefore must be changed each time a new panel is placed upon the Lighthouse 10. The Lamp 12 is centered with respect to the optical center of the Lighthouse 10 and the Panel 16 is centered onto the Lighthouse 10. Accordingly, the Excursion Distance $E_d$ is also centered with respect to the Lighthouse so that equal movements occur on both sides of the optical center. The Excursion Distance $E_d$ input can be provided manually by thumb wheel switches or from any of several sources. As an example, the mechanism which centers the Panel 12 onto the Lighthouse 10 can provide the number of pulses required to center the Panel and thus indicate the size of the Panel 16 and the Excursion Distance $E_d$ for the panel. Alternatively, when an industrial robot, such as a Unimate available from Unimation Corp., is used to place the Panel 16 onto the Lighthouse 10, the faceplate size can be set into the memory of the robot controller at a previous station along the processing line. When the robot places the panel onto the Lighthouse, the Excursion Distance $E_d$ can be provided by the robot controller. Irrespective, wether manually or automatically provided, the Excursion Distance $E_d$ is provided as an input to a Total Steps Divider 61. A Distance/Step Circuit 62 provides a Distance/Step Signal $S_d$ to the Total Steps Divider 61. The Distance/Step Signal $S_d$ is a constant for the system and is determined by the characteristics of the Motor 38. For example, if the motor 38 is a stepping motor which results in a 0.001 inch linear motion for each input pulse, the Signal $S_d$ will represent the 0.001 inch for each pulse. The total Steps Divider 61 provides a Total Step Signal $T_s$ which is indicative of the $S_d$ signal divided into the $E_d$ signal ($E_d/S_d$). Thus, for example, if the Excursion Distance $E_d$ is one inch and the Distance Step $S_d$ is 0.001 inch, the Total Steps Signal $T_s$ will contain the 1,000 pulses required for the Panel 16 to travel the full one inch. The Total Step Signal $T_s$ is provided to a Steps/Interval Divider 63 and a Pretravel Calculator 64. The Steps/Interval Divider 63 divides the Total Steps Signal $T_s$ into a preselected number of substantially equal intervals, such as 10, and provides a Steps/Interval Signal M on Output Line 66. The Interval Signal M is applied to an OR gate 67 and to a Move-Time Divider 68 contained with the Dwell-Move Calculator 27. The output of the Or Gate 67 is coupled through the Input Lead 54 of the AND Gate 52 to the Motor 38. The Pretravel Calculator 64 also provides an input to the OR Gate 67 so that an output signal from either the Steps/Interval Divider 63 or the Pretravel Calculator 64 will move the Motor 38. The Pretravel Calculator 64 also receives a System Excursion Distance Signal SED from a System Excursion Distance Generator 69.

The operation of the Pretravel Calculator 64 is explained with reference to the diagram of FIG. 3. The home, or neutral, position 71 of the Motor 38 is represented by the Line 71 and is shown to be the System Excursion Distance SED away from the Optical Center 72 of the Lighthouse 10. The distance between the Home Position Line 71 and the Optical Center 72 thus is the System Excursion Distance provided by the Excursion Distance Generator 69 of FIG. 2. This signal therefore is a constant for the system. The Distance $t_s$ is centered about the Optical Center 72 and is the total distance that the Panel 16 must move during exposure of the Coating 17. The $t_s$ Signal therefore, is received from the Total Step Divider 61 as the Total Steps Signal $T_s$. Prior to the opening of the Shutter 21, the Panel 16 must move a distance of SED—$t_s/2$ to insure that the Panel 16 travels equal distances on both sides of the Optical Center 72. Therefore, the Pretravel Calculator 64 subtracts the value $t_s/2$ from the System Excursion Distance SED and the panel 16 is moved this distance to the position represented by the Line 73 with the Shutter 21 closed. At this point, the Shutter 21 is opened by the Shutter Control 34 and the panel is intermittently moved by the Motor 38 the Distance $t_s$ to the position represented by the vertical Line 74 when the Shutter 21 is closed.

The intermittent motion is caused by the action of the Dwell-Move Calculator 27 of FIG. 2. The Steps/Interval Signal M available on Output Lead 66 is provided as an input to a Move-Time Divider 68 where the Steps-/Interval Signal M is divided by a step rate to provide a Move-Time Signal $M_t$ which is indicative of the portion of each interval during which panel motion occurs. The step rate is fixed for the system and in the preferred embodiment is 500 steps/second. The Move-Time Signal $M_t$ is provided to a Counts/Interval Divider 76 which provides a Move-Counts Interval Signal $n_M$. The Move-Counts/Interval Signal $n_M$ is indicative of the number of output pulses from the Counter 29 which move the Motor 38 during each of the ten intervals into which the total motion of Panel 16 is divided. The Move-Counts/Interval Signal $n_M$ is coupled by a Lead 77 to an OR Gate 78, the output of which is provided as an input to the Counter-Clock 29. The Counts/Interval Signal $n_M$ is provided to an Adder 79 which increases the Signal $n_M$ by 10% to accommodate for intensity changes of the Lamp 12 in a manner described hereinafter. The adjusted Move-Counts/Interval Signal $n_{MT}$ is input to an Adder 81 which also receives the Counts/Interval Signal n from the Exposure Control 24 over the Line 49. The Adder 81 subtracts the adjusted Move-Counts/Interval Signal $n_{MT}$ from the Counts/Interval Signal n to provide a Dwell-Counts/Interval Signal $n_D$. The Dwell-Counts/Interval Signal $n_D$ is provided on output Line 82 which is coupled to the other input of the OR Gate 78. Accordingly, the Dwell-Move Calculator 27 segments the Steps/Interval Signal M into the number of move counts required to effect the required motion for each interval. The remainder of each interval is the dwell counts during which no motion occurs. The output of the Counter-Clock 29 is thus controlled in accordance with the Move and Dwell counts and the Motor 38 thus alternately moves and dwells during each of the intervals. Vibration of the Shadow Mask 19 is thus eliminated and the objectionable "snake" of the phosphor lines also is eliminated.

The Shutter Control 34 includes an AND Gate 83 which receives inputs from the Pretravel Calculator 64, the Counter-Clock 29 and the Exposure Control 24. When all three input signals are present, the AND Gate 83 provides a signal to an OR Gate 84, the output of which is coupled by a Line 86 to the Shutter 21 to open the Shutter 21. The OR Gate 84 also receives a Manual Input 87 so that the Shutter can be opened and closed manually if desired. The output of the OR Gate 84 also is coupled to a Shutter Closed Return Home Circuit 87 which in its simplest form can be a NOR gate. Accordingly, when a high is available from the OR Gate 84 no output signal is provided by the Shutter Closed Circuit 87. However, when the shutter 21 is closed, a high is not available from the OR Gate 84 and the Shutter Closed Circuit 87 provides an output signal to the Input Lead 58 of the AND Gate 53. The Motor 38 is energized in the direction opposite from the exposure direction and returned to the Home Position 71 of FIG. 3.

OPERATION OF THE PREFERRED EMBODIMENT

Figure 3:
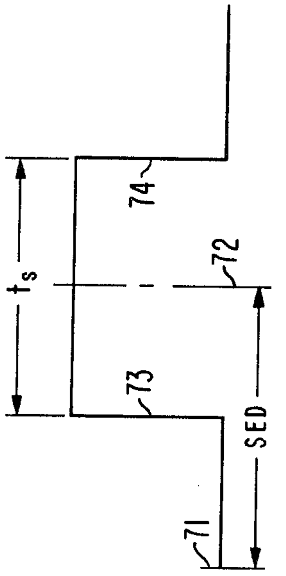
FIG. 3 shows how faceplates of different sizes require different numbers of motion steps during exposure.

In operation, a Panel 16 is placed on the Lighthouse 10 and centered with respect to the Optical Center 72, shown in FIG. 3. The centering is accomplished by any of several available types of mechanisms presently available. The Excursion Distance $E_d$ required for the Panel 16 to travel equal excursions on both sides of the Optical Center 72 can be set into the Motor Control 36, manually or by either a measuring mechanism associated with the centering mechanism, or a preset number established by the memory of the industrial robot control which transfers the Panel 16 to the Lighthouse 10. The Power To Frequency Converter 22 monitors the power supplied to the Lamp 12 and provides the Control Signal 25 the Frequency $f_o$ of which is a function of the intensity of the light output of the Lamp 12. The Control Signal 25 is applied to the Exposure Control 24 to maintain a constant light intensity-time multiple in a manner fully described in previously referenced co-pending application Ser. No. (267,750).

The Total Step Divider 61 divides the Excursion Distance $E_d$ by the Fixed Distance/Step $S_d$ to provide the Total Steps Signal $T_s$ to the Step/Interval Divider 63 and the Pretravel Calculator 64. The Motor 38 is then actuated to move the panel a distance equal to the difference between the Set Excursion Distance SED and $T_s/2$, while the Shutter 21 remains closed. When the Panel 16 reaches the Shutter Open Position 73, position 73 in FIG. 3, the Shutter 21 is opened to expose the Screen to light from the Lamp 12. The Panel 16 travels intermittently in the move-dwell intervals determined by the Dwell-Move Calculator 27 until the Total Distance $T_s$ is traveled and the Shutter Closed Position 74 of FIG. 3 is reached and the Shutter 21 is closed. The closing of the Shutter 21 actuates the Shutter Closed Circuit 87 and the rotation of the Motor 38 is reversed and the motor is returned to the Home Position 71.

An example of the calculations is presented as follows:

$f_r$=reference frequency=4.5 kHz
$f_o$=frequency of Control Signal 25
Ratio=fr/fo
t=preset exposure time
$t_I$=exposure time per interval
n=number of counts/interval
$T_r$=1/fr
M=number of steps/interval
Distance/Step $S_d$=0.001 inch
Total Steps $T_s$=total number of steps per exposure time
$M_t$=move time
$n_M$=number of move counts/interval
$n_{MT}$=adjusted move counts/interval
$n_D$=number of dwell counts/interval

LET:

EXCURSION DISTANCE
$E_d$=1.00 inch
$f_o$=4.7 kHz
t=15.0 sec.

THEN:

$$t_I = \frac{t}{10 \text{ intervals}} \qquad t_I = \frac{15.0 \text{ sec.}}{10 \text{ intervals}}$$

$$t_I = 1.5 \text{ sec/interval}$$

$$n = \frac{t_I \div Tr}{\text{Ratio}} \qquad n = \frac{1.5 \text{ sec/interval} \div 1/4.5\text{kHz}}{4.5\text{kHz} \div 4.7\text{kHz}}$$

$$n = 7050 \text{ counts/interval}$$

$$\text{Total Steps} = \frac{\text{EXCURSION DISTANCE}}{Sd} \qquad \text{Total Steps} = \frac{1.00 \text{ inch}}{.001 \text{ inch/step}}$$

$$\text{Total Steps} = 1000 \text{ steps}$$

-continued

| | |
|---|---|
| $M = \frac{\text{Total Steps}}{9 \text{ intervals}}$ | $M = \frac{1000 \text{ steps}}{9 \text{ intervals}}$ |
| | $M = 111$ steps/interval (+1 remainder) |
| $M_t = \frac{M}{\text{Rate of Stepping}}$ | $M_t = \frac{111 \text{ steps/interval}}{500 \text{ steps/sec.}}$ |
| $n_M = \frac{Mt \div Tr}{\text{Ratio}}$ | $n_M = \frac{222 \text{ msec/interval} \div 1/4.5\text{kHz}}{4.5\text{kHz} \div 4.7\text{kHz}}$ |
| | $n_M = 1043$ counts/interval |
| $n_{MT} = n_M + (n_M \cdot 0.1)$ | $n_{MT} =$ 1043 counts/interval + 104.3 counts/interval, Add 10% of $M_t$ to compensate for a possible change in lamp intensity |
| | $n_{MT} = 1147$ counts/interval |
| $n_D = n - n_{MT}$ | $n_D =$ 7050 counts/interval − 1147 counts/interval |
| | $n_D = 5903$ counts/interval |

The preferred embodiment is used in conjunction with an industrial robot which includes a programmable computer and which places the Panel 16 on the Lighthouse 10. After the robot places the panel on the Lighthouse the panel is centered. The panel is moved to the Shutter Open Position 73, and the Dwell Counts/Interval Signal $n_D$ is loaded into the Counter 29. The Shutter 21 is opened and each pulse from the VDC/Freq Converter 48 reduces the counter by one. When the count reaches zero, the end of the dwell counts is signified. The Move Counts/Interval Signal $n_M$ is loaded into the Counter 29. The Counte 29 and the AND Gate 52 are enabled so that the Motor 38 moves the Panel 16 at a rate of 500 steps/second. The computer within the robot counts the pulses from the encoder on the Lighthouse while the Counter 29 times out the move counts at the rate determined by the output Frequency $f_o$ of the Converter 48. When the counter reaches zero, the dwell counts for the second interval are loaded into the counter. This sequence is repeated for intervals 1 through 9, when ten intervals are used.

In the last, or tenth interval, the Total Counts/Interval n is loaded into the Counter 29, and the Motor 38 remains in dwell throughout the interval. When the counter reaches zero, the Shutter 21 closes and the Motor 38 reverses direction and returns to Home Position 71.

What is claimed is:

1. In a lighthouse used for exposing an actinic energy sensitive coating present on the inside surface of a picture tube panel with energy from an actinic energy source, an improved system for effecting intermittent relative motion between said panel and said energy source comprising:

support means for supporting said picture tube panel for relative movement between said panel and said energy source;

motor means for actuating said support means to effect relative motion between said panel and said energy source;

means for providing a control signal having a frequency related to the intensity of said actinic source;

control means for intermittently moving and stopping said relative motion for predetermined numbers of motion and dwell intervals during the exposure of said coating to said actinic energy, said control means including means for providing a signal representative of the total distance of said relative motion; and a dwell-move calculator for receiving said control signal and providing said motion and dwell intervals.

2. The system of claim 1 wherein said control is a binary signal, and wherein said system further includes a counter responsive to said binary signal and to said motion and dwell intervals for providing said motion and dwell intervals at a rate determined by the frequency of said control signal.

3. The system of claim 2 further including means for dividing said total distance signal by said incremental distance steps to provide a signal representative of the total number of steps used to effect said relative motion.

4. The system of claim 3 further including means for dividing said total number of steps into a plurality of motion control intervals.

5. The system of claim 4 wherein said dwell-move calculator separates each of said motion control intervals into said motion intervals and said dwell intervals.

6. The system of claim 1 or 5 further including means for determining a preexposure distance said panel must travel prior to exposure to said actinic energy whereby panels of all sizes are uniformally exposed to said energy.

7. The system of claim 6 further including shutter control means for opening and closing a shutter arranged between said energy source and said energy sensitive coating.

8. A method of intermittently moving a kinescope panel on a lighthouse having an energy source including the steps of:

monitoring the intensity of the energy output of said source and generating a control signal having a frequency related to said intensity;

determining the total excursion distance said panel moves with respect to said lighthouse, and dividing said excursion distance into a total number of steps required to travel said distance;

dividing said total number of steps by said control signal to establish a move time and a dwell time, and intermittently moving and dwelling said panel in accordance with said move time and said dwell time.

9. The method of claim 8 further including the step of dividing said total excursion time into a plurality of time intervals, and dividing each of said intervals into a move time and a dwell time.

10. The method of claim 9 further including the step of calculating a pretravel distance to accommodate various sizes of panels, including the step of setting a fixed travel distance and subtracting one-half of said excursion distance from said fixed travel distance.

11. The method of claim 10 wherein said lighthouse includes a shutter for admitting and blocking said energy and further including the step of opening said shutter during said excursion distance.

* * * * *